United States Patent
Sakai

(10) Patent No.: US 8,612,965 B2
(45) Date of Patent: Dec. 17, 2013

(54) FIRMWARE UPDATING APPARATUS, FIRMWARE UPDATING METHOD, AND STORAGE MEDIUM

(75) Inventor: Katsuya Sakai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 970 days.

(21) Appl. No.: 12/710,180

(22) Filed: Feb. 22, 2010

(65) Prior Publication Data

US 2010/0218178 A1    Aug. 26, 2010

(30) Foreign Application Priority Data

Feb. 25, 2009   (JP) ................................. 2009-042571

(51) Int. Cl.
G06F 9/44            (2006.01)
(52) U.S. Cl.
USPC ............ 717/170; 717/171; 717/172; 717/173
(58) Field of Classification Search
USPC ................................. 717/170–173
See application file for complete search history.

(56) References Cited

U.S. PATENT DOCUMENTS

2005/0097543 A1* 5/2005 Hirayama ...................... 717/168
2006/0095566 A1* 5/2006 Kanai ............................ 709/224
2009/0328023 A1* 12/2009 Bestland et al. ............... 717/168

FOREIGN PATENT DOCUMENTS

CN         101169719 A    4/2008
JP         2006-129362 A  5/2006

* cited by examiner

Primary Examiner — Li B Zhen
Assistant Examiner — Duy Khuong Nguyen
(74) Attorney, Agent, or Firm — Carter, DeLuca, Farrell & Schmidt LLP

(57) ABSTRACT

Disclosed is a method that includes specifying a firmware version to be updated; determining whether or not a direct update from a current firmware version to the specified firmware version is enabled; determining whether or not the update to the specified firmware version enabled through an intervention of another version update, if it is determined that the direct update to the specified firmware version is disabled; and executing the update to the specified firmware version through the intervention of another version update, if it is determined that the update from the current firmware version to the specified firmware version is enabled through the intervention of another version update.

17 Claims, 14 Drawing Sheets

| FIRMWARE VERSION | MAIN CONTROLLER VERSION | SCANNER CONTROLLER VERSION | PRINTER CONTROLLER VERSION |
|---|---|---|---|
| 1.0.1 | 1.1 | 1.1 | 1.1 |
| 1.1.1 | 1.2 | 1.1 | 1.1 |
| 2.0.1 | 2.1 | 1.1 | 1.2 |
| 3.0.1 | 3.1 | 1.1 | 1.2 |

| ID | MODEL | TYPE | VERSION | OPERATION-GUARANTEED VER | FILE NAME |
|---|---|---|---|---|---|
| 0 | ABC1000 | NORMAL FIRMWARE | 1.0.1 | — | Firmware-1.0.1.pkg |
| 1 | ABC1000 | SPECIAL FIRMWARE 1 | 50.0.1 | 1.0.1 | Firmware-50.0.1.pkg |
| 2 | ABC1000 | NORMAL FIRMWARE | 1.1.1 | 1.0.1 | Firmware-1.1.1.pkg |
| 3 | ABC1000 | NORMAL FIRMWARE | 2.0.1 | 1.1.1 | Firmware-2.0.1.pkg |
| 4 | ABC1000 | SPECIAL FIRMWARE 1 | 50.0.2 | 50.0.1 | Firmware-50.0.2.pkg |
| 5 | ABC1000 | NORMAL FIRMWARE | 3.0.1 | 1.1.1<br>2.0.1 | Firmware-3.0.1.pkg |
| 6 | ABC1000 | SPECIAL FIRMWARE 2 | 60.0.1 | 3.0.1 | Firmware-60.0.1.pkg |

| TYPE | KEYCODE |
|---|---|
| SPECIAL FIRMWARE 1 | 12340000 |
| SPECIAL FIRMWARE 2 | 56789999 |

UPDATING STEP INFORMATION FILE

DOWNLOAD DATE/TIME: 2008/11/22 0:00
UPDATE TIMING: AUTOMATIC
PROGRESS STATUS: DOWNLOAD WAITING
APPLICATION SEQUENCE:
1: VERSION 1. 1. 1
2: VERSION 3. 0. 1

UPDATING STEP INFORMATION FILE

DOWNLOAD DATE/TIME: 2008/11/22 0:00
UPDATE TIMING: MANUAL
PROGRESS STATUS: DOWNLOAD WAITING
APPLICATION SEQUENCE:
1: VERSION 3. 0. 1

FIRMWARE UPDATING APPARATUS, FIRMWARE UPDATING METHOD, AND STORAGE MEDIUM

BACKGROUND OF THE INVENTION

1. Field of the Invention

The present invention relates to a firmware updating apparatus, a firmware updating method, and a storage medium for the update of the firmware.

2. Description of the Related Art

Japanese Patent Laid-Open 2006-129362 discloses a technique for downloading firmware from a firmware distribution server to a firmware updating apparatus via a network so as to perform a firmware update of the firmware updating apparatus. In this technique, firmware can be updated automatically at a designated time.

In the aforementioned technique, when normal update processing is not performed by a device having a facsimile receiving function for some reason, a major situation such as the failure to receive an important facsimile may occur. Hence, the technique can only perform an automatic update between operation-guaranteed versions.

SUMMARY OF THE INVENTION

The present invention provides a method that includes specifying a firmware version to be updated; determining whether or not a direct update from a current firmware version to the specified firmware version is enabled; determining whether or not the update to the specified firmware version is enabled through an intervention of another version update, if it is determined that the direct update to the specified firmware version is disabled; and executing the update to the specified firmware version through the intervention of another version update, if it is determined that the update from the current firmware version to the specified firmware version is enabled through the intervention of another version update.

Further features of the present invention will become apparent from the following description of exemplary embodiments (with reference to the attached drawings).

DESCRIPTION OF THE EMBODIMENTS

Hereinafter, various embodiments of the present invention will now be described with reference to the accompanying drawings.

<Firmware Updating System>

Figure 1:
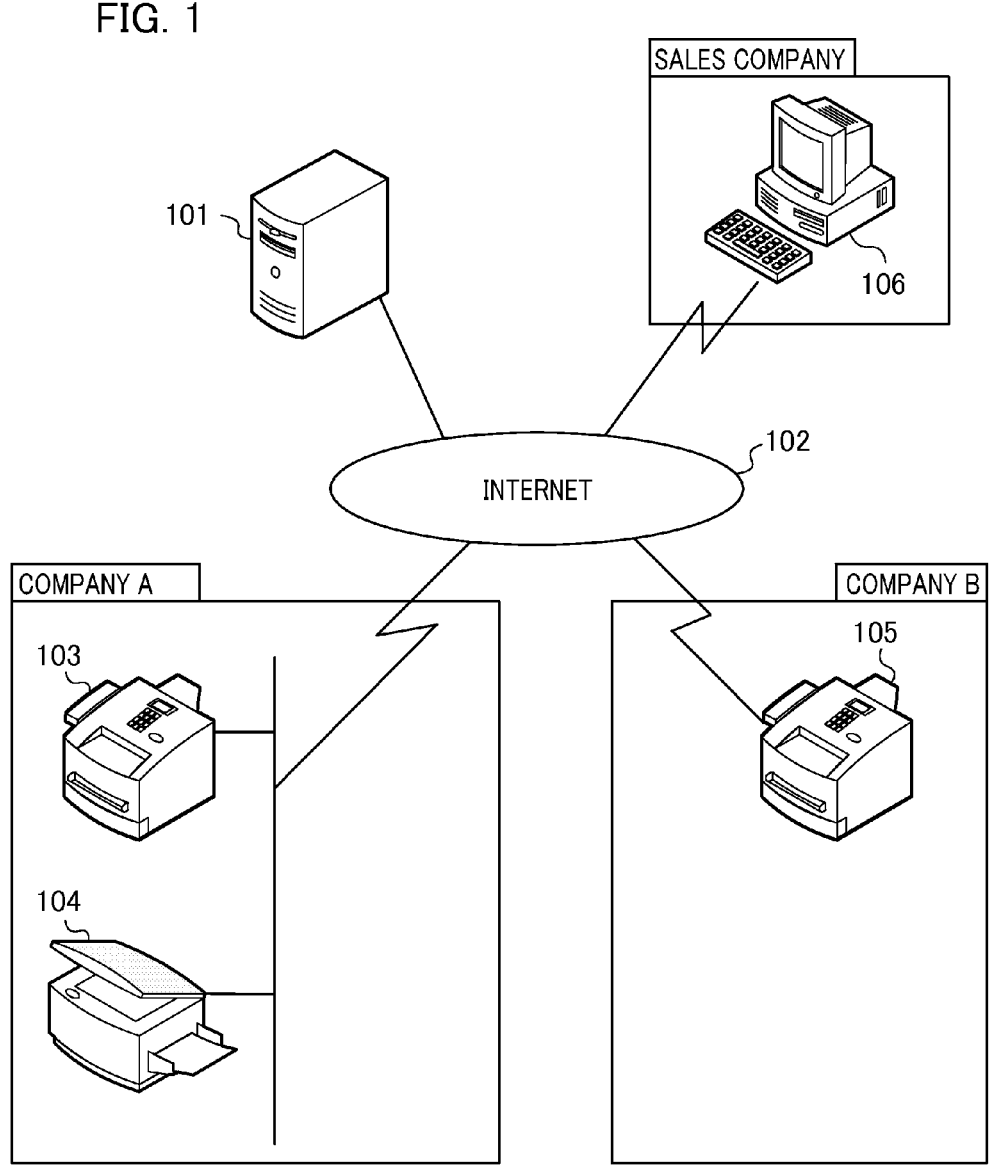
FIG. 1 is a diagram showing an example of the configuration of a firmware updating system according to an embodiment of the present invention.

FIG. 1 is a diagram showing an example of the configuration of a firmware updating system according to an embodiment of the present invention. The firmware updating system 100 is configured by the firmware distribution server 101, the firmware updating apparatuses 103, 104, and 105, and a computer 106 that are respectively connected to a network 102. As an example of the firmware updating apparatuses 103, 104, and 105 shown here, the present embodiment of the present invention assumes an image forming apparatus that executes various image forming operations. In the firmware updating system 100, it is assumed, for example, that the firmware updating apparatuses 103 and 104 are owned by Company A and the firmware updating apparatus 105 is owned by Company B. In addition, it is assumed that the computer 106 is owned by a firmware sales company.

The firmware distribution server 101 carries out the transmission of firmware-related information and the distribution of firmware itself upon request by the firmware updating apparatuses 103, 104, and 105. Each of the firmware updating apparatuses 103, 104, and 105 is a device having a function such as copying or printing, and a plurality of firmwares is installed therein so as to manage scanner control and printer control. The firmware updating apparatuses 103, 104, and 105 can acquire the applicable firmware via the firmware distribution server 101 so as to update it. The computer 106 owned by the sales company performs firmware management of the firmware distribution server 101, such as registration and deletion of firmware to be distributed, update of firmware information, and the like, with respect to the firmware distribution server 101. The types of firmware include normal firmware as well as special firmware that have been customized in response to a client. For example, for the firmware updating apparatus 103 of Company A and the firmware updating apparatus 105 of Company B, functionally different firmware can be downloaded for an operation even if the apparatuses 103 and 105 are the same model.

<Hardware Configuration of Firmware Distribution Server>

Figure 2:
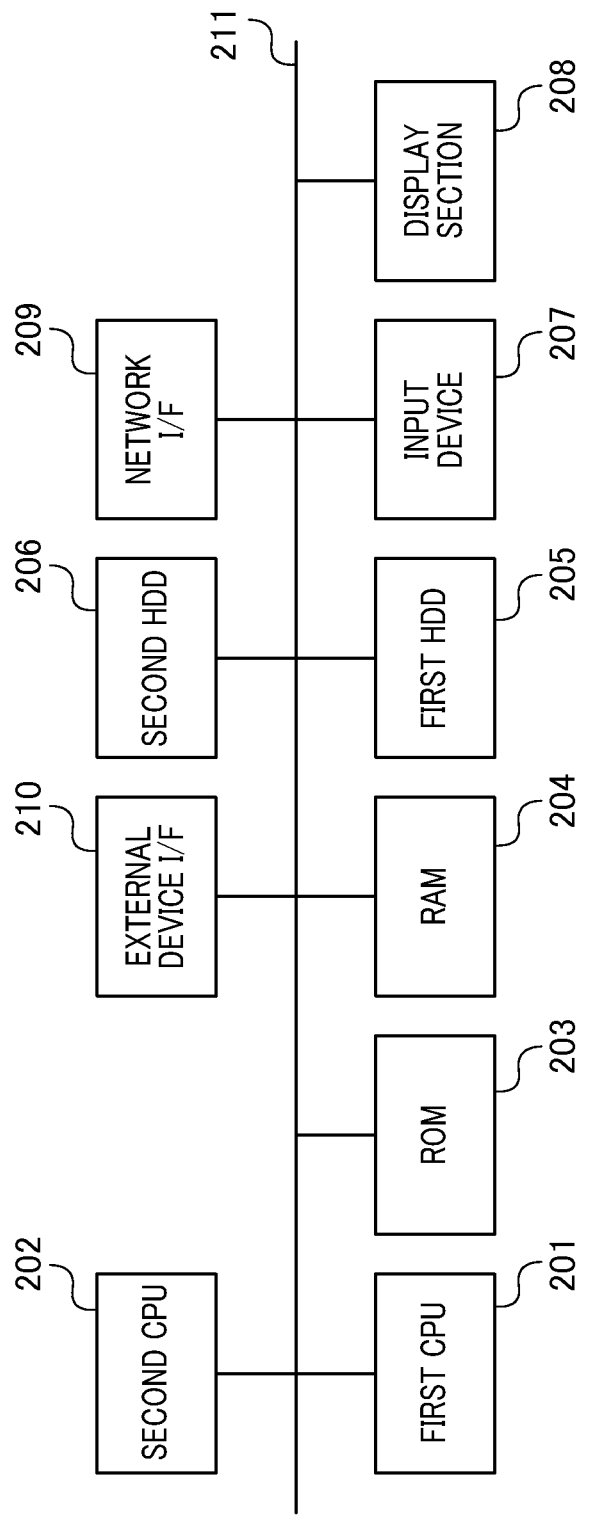
FIG. 2 is a block diagram showing the hardware configuration of a firmware distribution server 101.

Next, the hardware configuration of the firmware distribution server according to the present embodiment of the present invention will be described. FIG. 2 is a block diagram showing the hardware configuration of the firmware distribution server 101.

In FIG. 2, a first CPU 201 and a second CPU 202 control each functional section of the firmware distribution server 101. A ROM 203 stores storage media and data for each process of the firmware distribution server 101. A RAM 204 electrically stores temporary data for each process of the firmware distribution server 101. A first HDD 205 and a second HDD 206 store programs for each process of the firmware distribution server 101, information relating to a firmware updating apparatus that distributes various data and firmware, firmware to be distributed, information about the firmware, and the like.

In the firmware distribution server 101, a program for executing firmware distribution of the present embodiment of the present invention is stored in the first HDD 205 or the second HDD 206. The program uses the RAM 204 as a temporary saving area, and is invoked and executed by the first CPU 201 or the second CPU 202.

An input device 207 receives an instruction that has been input to the firmware distribution server 101. This is composed of a keyboard or a pointing device. A display section 208 displays an operation status of the firmware distribution server 101 and information that is output by each program that operates on the firmware distribution server 101. A network I/F (interface) 209 is connected to a LAN and the Internet via a network and exchanges information with an external device. An external equipment I/F (interface) 210 controls the connection with an external memory equipment and the like. Each functional section described above is connected through a system bus 211 that is responsible for the flow of data within the device.

<Hardware Configuration of Firmware Updating Apparatus>

Figure 3:
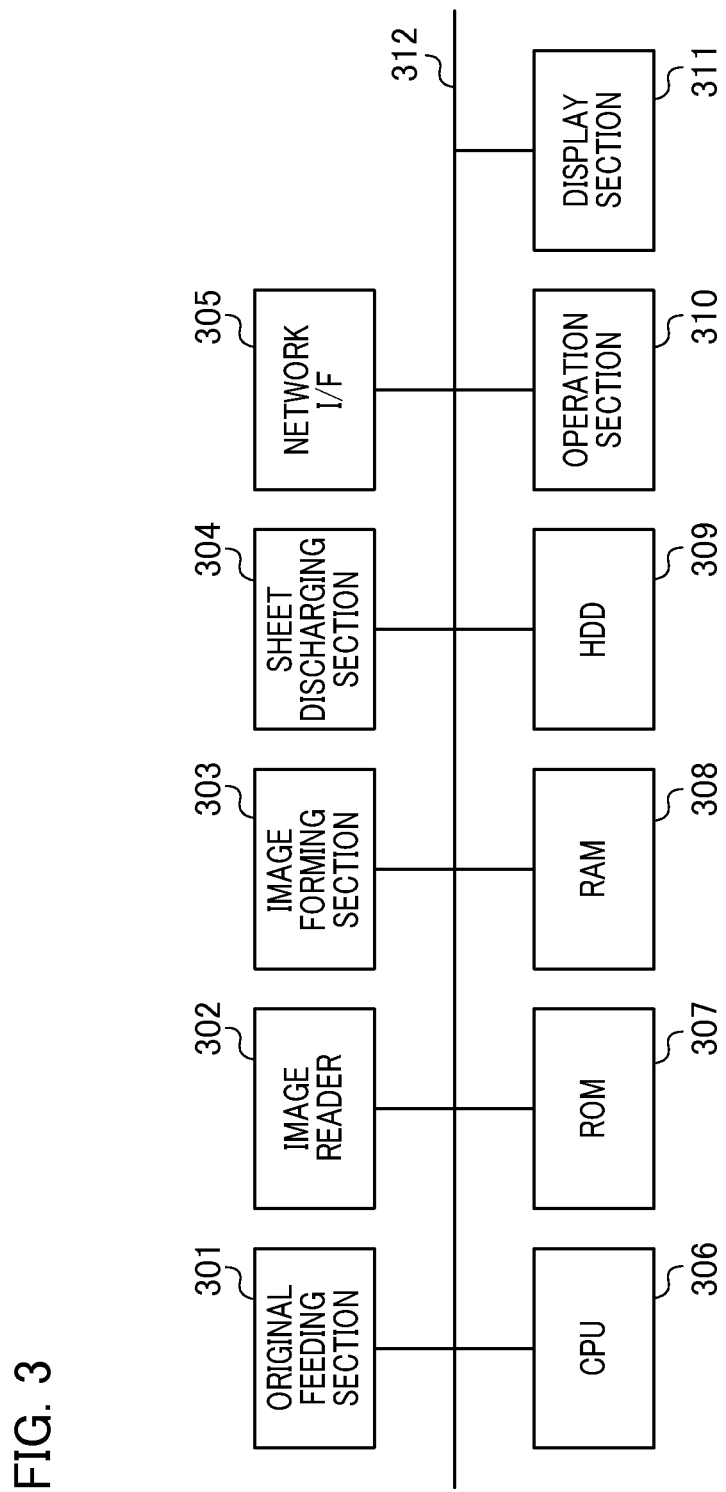
FIG. 3 is a block diagram showing the hardware configuration of each of firmware updating apparatuses 103, 104, and 105.

Next, the hardware configuration of the firmware updating apparatus according to the present embodiment of the present invention will be described. FIG. 3 is a block diagram showing the hardware configuration of each of the firmware updating apparatuses 103, 104, and 105. The image forming apparatus employed in the present embodiment of the present invention assumes a multifunction machine that is integrally provided with printer and facsimile functions. The multifunction machine may be a printer (including an electro photographic or ink-jet printer) that receives data from a PC and performs printing, a scanner, a facsimile, or the like. The configuration of the firmware updating apparatus shown in FIG. 3 assumes a multifunction machine.

In FIG. 3, an original feeding section 301 feeds an original document into an image reader 302. The image reader 302 reads the original document fed from the original feeding section 301 and converts it into a printing image for printout. An image forming section 303 converts data stored in a storage unit such as a HDD (hard disk) 309 to be described below or data received via a network into a printing image for printout. A sheet discharging section 304 discharges a sheet that is printed and output, and carries out processes such as sorting, stapling, and the like. A network I/F 305 is connected to a LAN and the Internet via a network and exchanges information with an external device. A CPU 306 manages each process such as copying, scanning, printing, and the like on the firmware updating apparatus. A ROM 307 that serves as a nonvolatile storage unit stores programs and data for each process of the firmware updating apparatus. A RAM 308 that serves as a rewritable storage unit electrically stores temporary data for each process of the firmware updating apparatus. A HDD 309 stores programs and data for each process of the firmware updating apparatus, user data that has been transmitted from an external device, and the like. The firmware updating apparatus has a program for executing an image forming process in the HDD 309. The program uses the RAM 308 as a temporary storage area, which is invoked and executed by the CPU 306. An operation section 310 receives an instruction input to the firmware updating apparatus. A display section 311 displays an operation status of the firmware updating apparatus and information relating to the operation for the operation section 310. Each functional section described above is connected via a system bus 312 that serves the flow of data within the device.

<Functional Configuration of Firmware Distribution Server>

Figure 4:
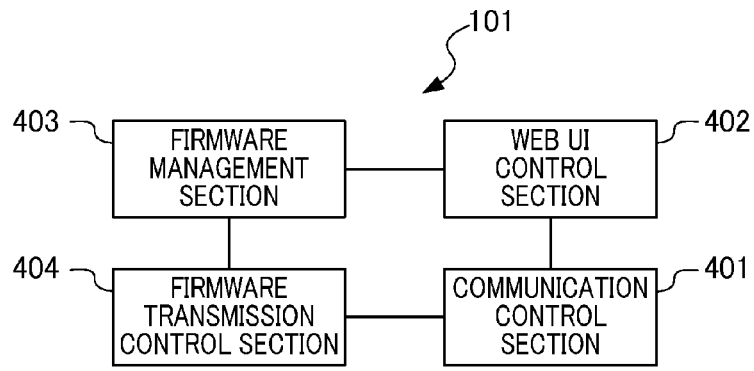
FIG. 4 is a block diagram showing the functional configuration of the main portion of the firmware distribution server 101.

Next, the functional configuration of the main portion of the firmware distribution server according to the present embodiment of the present invention will be described. FIG. 4 is a block diagram showing the functional configuration of the main portion of the firmware distribution server 101. The firmware distribution server 101 includes a communication control section 401, a Web UI (User Interface) control section 402, a firmware management section 403, and a firmware transmission control section 404.

The communication control section 401 controls the connection with a network to transmit data to and receive data from the firmware updating apparatuses 103, 104, and 105 and the computer 106. The communication control section 401 can realize the functions thereof with the first CPU 201 or the second CPU 202 and the network I/F 209 shown in FIG. 2, for example.

The Web UI control section 402 controls the UI for managing firmware based on the external control of the computer 106. The communication control section 401 is constituted by, for example, the first CPU 201 or the second CPU 202, the input device 207, and the display section 208 shown in FIG. 2, and can realize the functions thereof by executing a predetermined program by the first CPU 201 or the second CPU 202.

The firmware management section 403 performs registration and deletion of firmware via the Web UI control section 402, and information management of the registered firmware. The firmware management section 403 can realize the functions thereof by executing a predetermined program by the first CPU 201 or the second CPU 202 shown in FIG. 2, for example.

The firmware transmission control section 404 performs selection and transmission of firmware information and firmware in response to a request from the firmware updating apparatuses 103, 104, and 105 and the like. The firmware transmission control section 404 can realize the functions thereof by executing a predetermined program by the first CPU 201 or the second CPU 202 shown in FIG. 2, for example.

<Functional Configuration of Firmware Updating Apparatus>

Figure 5:
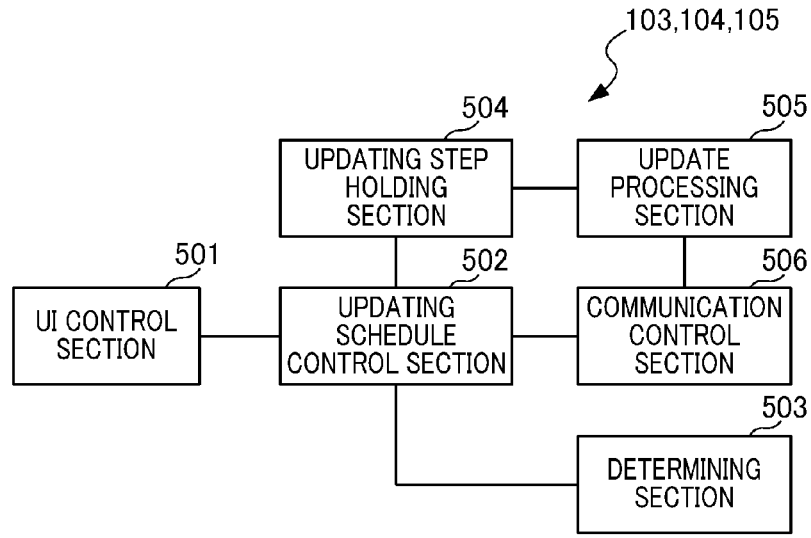
FIG. 5 is a block diagram showing the functional configuration of the main portion of each of the firmware updating apparatuses 103, 104, and 105.

Next, the functional configuration of the main portion of the firmware updating apparatus according to the present embodiment of the present invention will be described. FIG. 5 is a block diagram showing the functional configuration of the main portion of each of the firmware updating apparatuses 103, 104, and 105. Each functional section shown in FIG. 5 manages processes involved in firmware update performed by the firmware updating apparatuses 103, 104, and 105. Each of the firmware updating apparatuses 103, 104, and 105 includes a UI control section 501, an updating schedule control section 502, a determining section 503, an updating step holding section 504, an update processing section 505, and the communication control section 506.

The UI control section 501 (firmware version specifying unit, automatic update selecting unit) displays a menu screen for firmware update or displays a firmware update schedule setting screen. The UI control section 501 allows a user to specify the firmware version to be updated on the basis of the information that has been acquired from the firmware distribution server 101. Also, the UI control section 501 allows a user to select whether or not an automatic update is performed. The UI control section 501 is constituted by the CPU 306, the operation section 310, and the display section 311 shown in FIG. 3, for example, and can realize the functions thereof by executing a predetermined program by the CPU 306.

The updating schedule control section 502 sets a firmware updating schedule in response to the UI settings to be controlled with the UI control section 501. The updating schedule control section 502 can realize the functions thereof by executing a predetermined program by the CPU 306 shown in FIG. 3, for example.

The determining section 503 determines whether or not an update of the firmware version is available when the firmware updating schedule is set. For example, the determining section 503 determines whether or not an update from the firmware version in current use to the version of the specified firmware is enabled through the intervention of another operation-guaranteed version update. The determining section 503 can realize the functions thereof by executing a predetermined program by the CPU 306 shown in FIG. 3, for example.

The updating step holding section 504 holds information (information about, for example, when firmware is downloaded, when downloaded firmware is applied, what procedure is followed for firmware application, or the like) for the scheduled update. The updating step holding section 504 can realize the functions thereof by executing a predetermined program by the CPU 306, the RAM 308, the HDD 309, and the like shown in FIG. 3, for example.

The update processing section 505 executes the firmware update on the basis of the information held in the updating step holding section 504. For example, the update processing section 505 downloads the version of the specified firmware from the firmware distribution server 101 so as to execute update processing when the automatic update has been selected by the UI control section 501. Also, the update processing section 505 downloads only the version of the specified firmware from the firmware distribution server 101 and does not execute update processing when the automatic update has not been selected by the UI control section 501. The update processing section 505 can realize the functions thereof by executing a predetermined program by the CPU 306 shown in FIG. 3, for example.

The communication control section 506 (firmware information acquiring unit) controls the connection with a network to transmit data to and receive data from the firmware distribution server 101. For example, the communication control section 506 may receive firmware information from the firmware distribution server 101 when a firmware updating schedule is set, or may receive firmware from the firmware distribution server 101 when a firmware update is performed. The communication control section 506 can realize the functions thereof by the CPU 306 and the network I/F 305 shown in FIG. 3, for example.

<Each Process Related to Firmware Update>

Hereinafter, each process related to firmware update according to the present embodiment of the present invention will be described.

Figure 6:
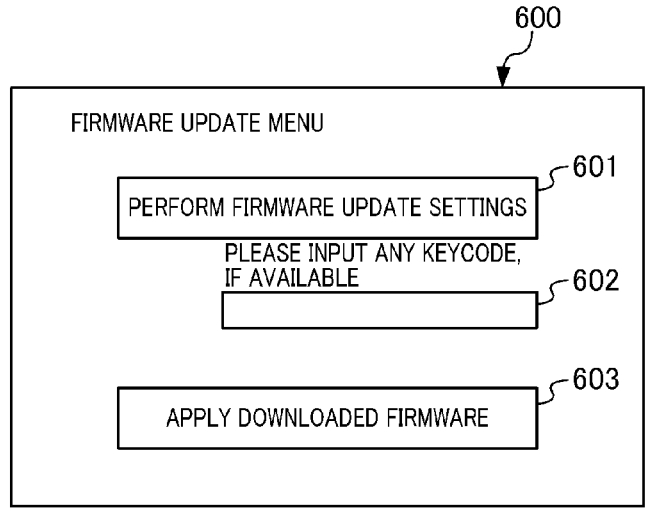
FIG. 6 is a diagram showing an example of a firmware updating menu screen.

FIG. 6 is a diagram showing an example of a firmware updating menu screen. The firmware updating menu screen 600 is displayed on the display section 311 when a firmware update is selected from the setting menu of the firmware updating apparatuses 103, 104, and 105. The firmware updating menu screen consists of a button 601, a keycode input area 602, and a button 603.

The button 601 is a button for making a transition to a screen for setting a firmware update. The keycode input area 602 is an area for inputting a keycode. When firmware is updated to special firmware, a predetermined keycode is input to the keycode input area 602, whereas when normal firmware is employed, there is no need to input any keycode therein. Also, the button 603 is a button for applying the downloaded firmware when downloaded firmware is already present.

Figures 7, 8:
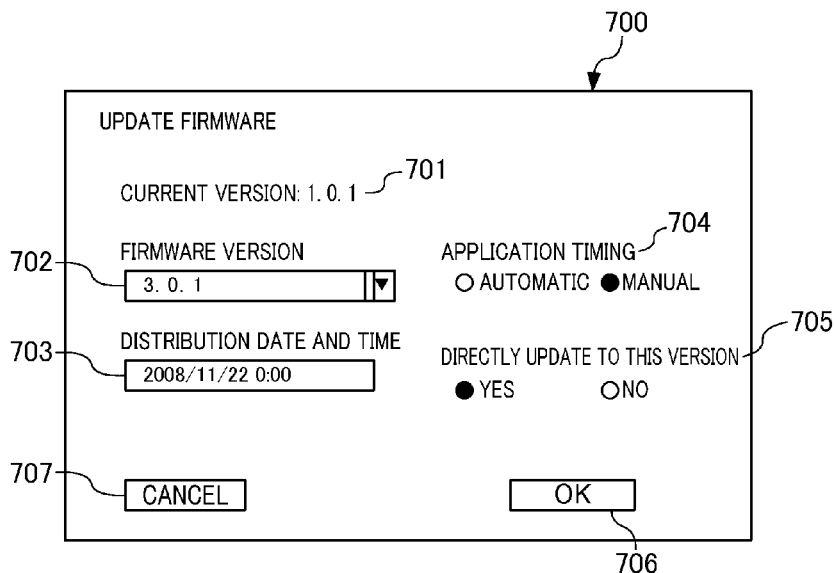
FIG. 7 is a diagram showing an example of the firmware updating information setting screen.
FIG. 8 is a table showing an example of the correspondence between a firmware version to be displayed on a version display area 701 and a firmware version installed in each device.

FIG. 7 is a diagram showing an example of the firmware updating information setting screen. The firmware updating information setting screen 700 is displayed on the display section 311 after the button 601 shown in FIG. 6 is depressed. The firmware updating information setting screen 700 is constituted by a version display area 701, a combo box 702, a date/time input area 703, toggle buttons 704 and 705, and buttons 706 and 707.

The version display area 701 displays the version of the currently-operating firmware. The version to be displayed here is not the version of individual firmware operating in the device, but the version that is assigned with respect to the combination of the versions of the firmware operating in the device. FIG. 8 is a table showing an example of the correspondence between a firmware version to be displayed on a version display area 701 and a firmware version installed in each device.

The combo box 702 is a UI that selects the firmware version to be updated. Here, a selectable version is determined on the basis of the information that has been received from the firmware distribution server 101. Not only a version newer than a current version but also a version older than that can be selected.

The date/time input area 703 is a UI that specifies the date/time during which firmware is downloaded from the firmware distribution server 101. When the past date/time is set, download processing is immediately started.

The toggle button 704 is a UI that specifies the timing at which the firmware that has been downloaded from the firmware distribution server 101 is actually applied to the firmware updating apparatuses 103, 104, and 105. When the "automatic" mode is selected, the downloaded firmware is automatically applied thereto immediately after the completion of download. When the "manual" mode is selected, firmware is only downloaded at the distribution date/time, and the downloaded firmware is applied thereto when the button 603 shown in FIG. 6 is pressed. The "automatic" mode of the application timing can only be selected when an update from the current version to the specified version is operationally guaranteed or when the specified version can be attained by repeating the operation-guaranteed updates. If this condition is not satisfied, the "automatic" mode cannot be selected.

The toggle button 705 enables the specified version to be reached by repeating the operation-guaranteed updates, however, it is a button that can be set only when the update timing is set to the "manual" mode. Here, if "No" is selected, firmware update processing is performed by repeating the operation-guaranteed updates. On the other hand, if "Yes" is selected, firmware is directly updated to the specified version. When the update timing is in the "automatic" mode, the button is not operable and the operation is the same as that when "No" is selected.

The button 706 is a button for determining the setting items. When this button is depressed, a firmware update is scheduled on the basis of the setting contents.

The button 707 is a button for canceling the settings. When this button is depressed, the set contents are revoked and the screen returns to the original screen.

Figure 9:
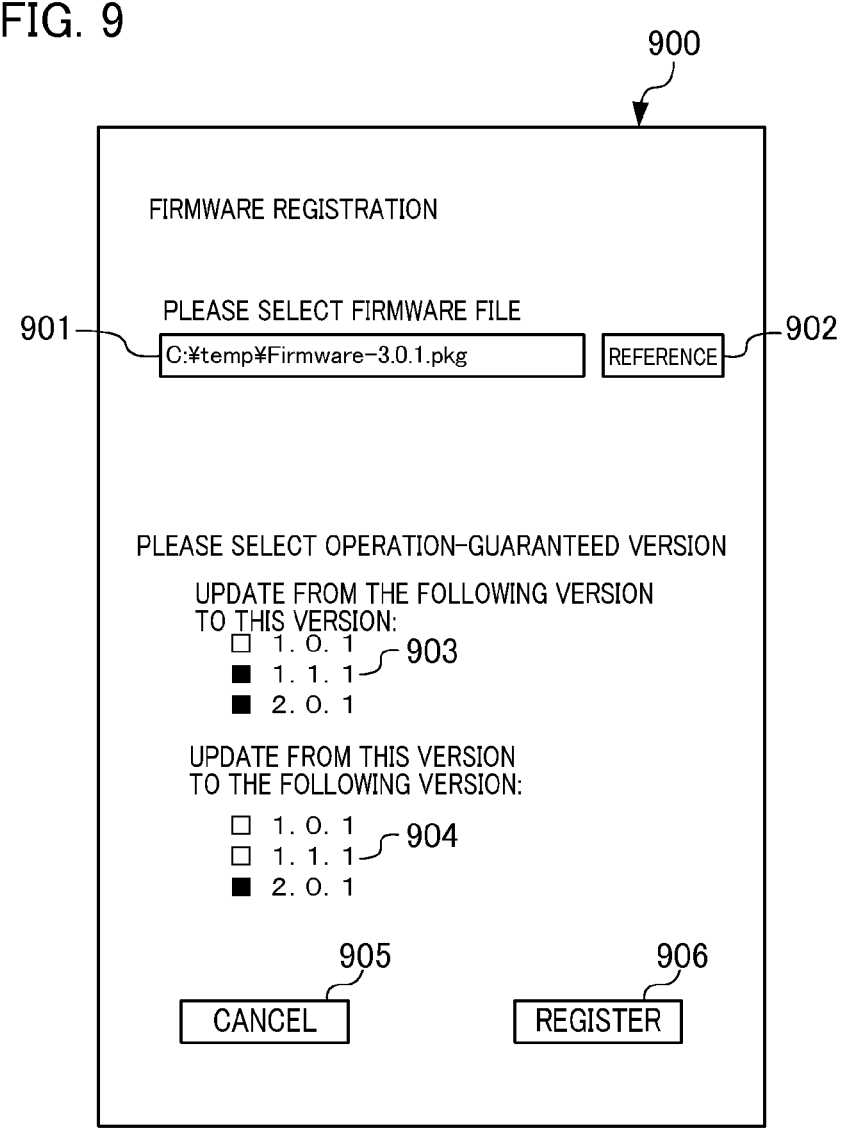
FIG. 9 is a diagram showing an example of a firmware registration screen.

FIG. 9 is a diagram showing an example of a firmware registration screen. First, when the computer 106 is connected to a URL for the firmware management of the firmware distribution server 101, a firmware management screen is displayed on the display section of the computer 106. Here, registration and deletion of firmware and an update of information can be performed. Then, when firmware registration is selected on the firmware management screen, a firmware registration screen 900 shown in FIG. 9 is displayed on the display section of the computer 106. The firmware registration screen 900 is constituted by a file designation area 901, a reference button 902, check boxes 903 and 904, and buttons 905 and 906.

The file designation area 901 is a UI for setting the file of firmware to be registered. When an operator causes the file designation area 901 to display the filename of firmware to be registered and pushes the reference button 902, the OS file browser is opened to make the file selectable. Then, when the file is selected via the file browser, the selected file is set to the file designation area 901. Each of the check boxes 903 and 904 is a UI for specifying an operation-guaranteed version. The check box 903 is a box for setting a version that is operation-guaranteed for update processing to the firmware to be registered. The check box 904 is a box for setting a version that is operation-guaranteed for update processing from firmware to be registered. The button 905 is a cancel button for revoking the set contents and going back to the firmware management screen. The button 906 is a registration button for registering the set contents on the firmware distribution server 101.

Figure 10:
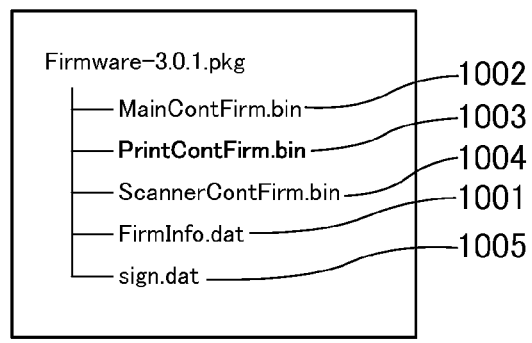
FIG. 10 is a diagram showing an example of file contents to be displayed on a file designation area 901 when firmware is registered.

FIG. 10 is a diagram showing an example of file contents to be displayed on the file designation area 901 when firmware is registered. The file is a combination of a plurality of files, and is constituted by an information file 1001, a plurality of firmware files 1002, 1003, and 1004, and a signature file 1005.

In this example, the file includes three kinds of firmware, including the main controller firmware 1002, the printer controller firmware 1003, and the scanner controller firmware 1004. The information file 1001 includes the corresponding information between the type and the filename of each firmware included therein and the version information. The signature file 1005 is employed to verify that the file is not falsified.

Figures 11, 12:
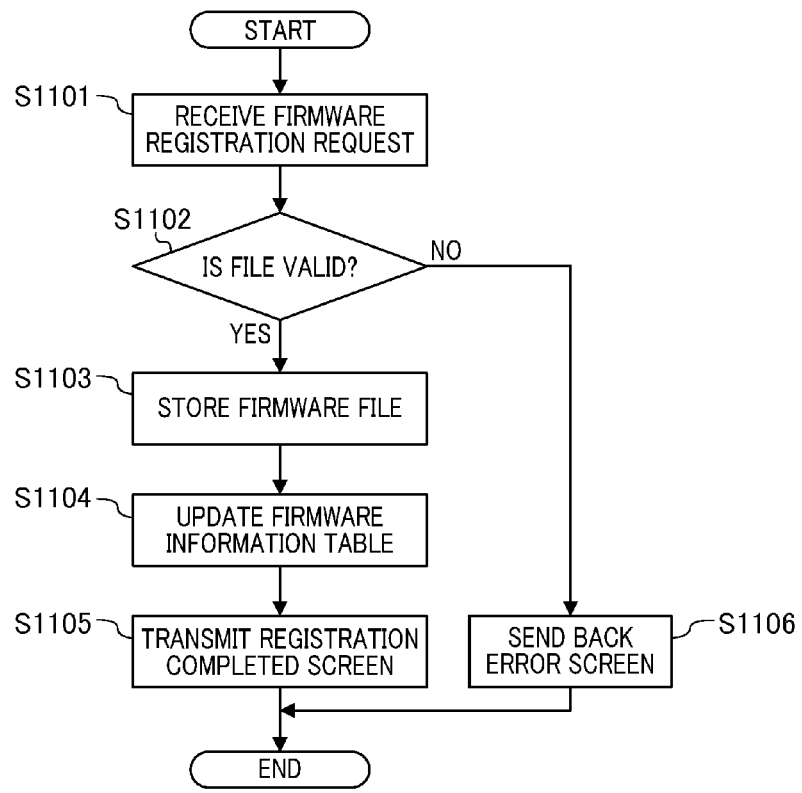
FIG. 11 is a flowchart showing the procedure of firmware registration processing performed by the firmware distribution server 101.
FIG. 12 is a table showing an example of a firmware information table.

Next, the procedure of firmware registration processing performed by the firmware distribution server 101 depending on the request from the external computer 106 will be described. FIG. 11 is a flowchart showing the procedure of firmware registration processing performed by the firmware distribution server 101.

In the flowchart shown in FIG. 11, first, a firmware registration request is received (step S1101). This processing is performed by the communication control section 401 shown in FIG. 4, for example. It should be noted that the firmware registration request also includes a firmware file.

Next, it is determined whether or not the file is activated (step S1102). More specifically, the firmware management section 403 shown in FIG. 4 determines whether or not the signature on the file of the received firmware is verified and the format of the information file in the received file is a predetermined format. Here, when the firmware management section 403 determines that the file is inactivated (No in step S1102), an error screen is sent back (step S1106). More specifically, the Web UI control section 402 shown in FIG. 4 transmits a screen indicating that an error has occurred during firmware registration to the computer 106 via the communication control section 401.

On the other hand, when it is determined that the file is activated in step S1102 (Yes in step S1102), the firmware file is stored (step S1103). Here, the firmware management section 403 shown in FIG. 4, for example, stores the received firmware file in the first HDD 205, the second HDD 206, or the like shown in FIG. 2.

Next, a firmware information table is updated (step S1104). More specifically, the firmware management section 403 updates the firmware information table (detailed later) on the basis of the information included in the received registration request, and stores it in the first HDD 205, the second HDD 206, or the like.

Then, a registration completion screen is transmitted (step S1105). More specifically, the Web UI control section 402 transmits a screen, which indicates that firmware registration has been completed, to the computer 106 via the communication control section 401.

Next, a firmware information table to be held by the firmware distribution server 101 will be described. FIG. 12 is a table showing an example of a firmware information table. As shown in FIG. 12, the records in a firmware information table 1200 are constituted by various kinds of information such as an ID, type, model, version, operation-guaranteed version, and filename. The ID is an identifier that is assigned to each record. The type shows the type of firmware. For example, normal firmware, special firmware specific to a particular client, issue analyzing firmware for analyzing an issue occurring in the market, and the like are present. The model is information indicating to which model the firmware corresponds. The version is information indicating the version of the firmware. The operation-guaranteed version indicates that an update from a certain version is operation-guaranteed. For example, for firmware of version 1.1.1, it indicates that an update from firmware of version 1.0.1 is operation-guaranteed, whereas an update from firmware of any other version is not operation-guaranteed. Also, the filename is a name of the file to be stored in the storage device (first HDD 205 and the like) of the firmware distribution server 101.

Figure 13:
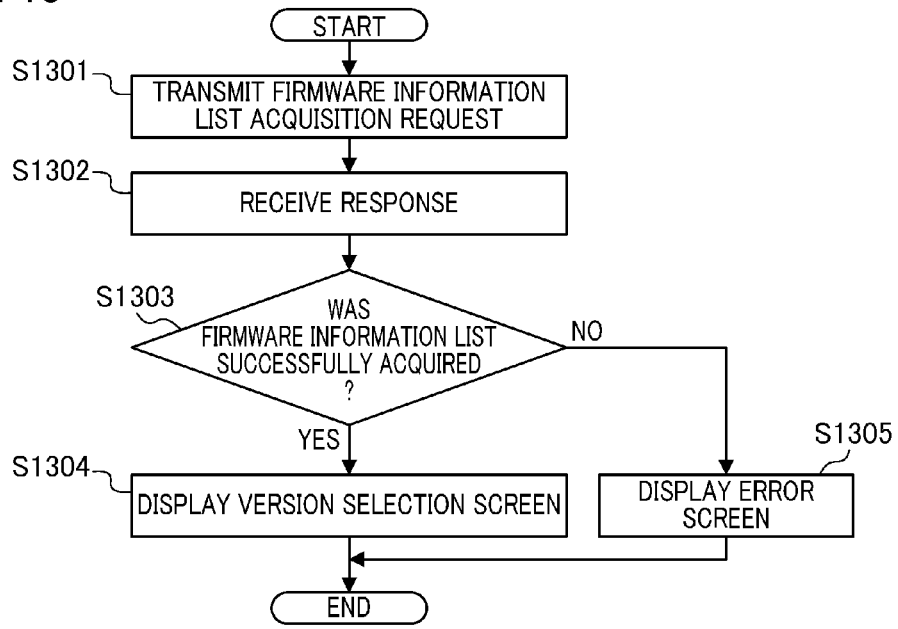
FIG. 13 is a flowchart showing the processing procedure when the firmware updating apparatuses 103, 104, and 105 make a firmware information list distribution request to the firmware distribution server 101.

Next, the processing procedure that occurs when the firmware updating apparatuses 103, 104, and 105 make a firmware information list distribution request to the firmware distribution server 101 will be described. FIG. 13 is a flowchart showing the processing procedure when the firmware updating apparatuses 103, 104, and 105 make a firmware information list distribution request to the firmware distribution server 101.

In the flowchart shown in FIG. 13, first, a firmware information list acquisition request is transmitted (step S1301). It should be note that the processing of the flowchart is started when the button 601 is depressed on the screen.

More specifically, the updating schedule control section 502 shown in FIG. 5, for example, transmits a firmware information list acquisition request to the firmware distribution server 101 in response to the UI settings to be controlled using the UI control section 501. The firmware information list acquisition request includes the model information of the firmware updating apparatus and attached optional information. If any keycode is input, keycode information is also included in the request.

Next, a response is received (step S1302). Here, the communication control section 506 shown in FIG. 5 receives a response from the firmware distribution server 101.

Next, it is determined whether or not a firmware information list has been successfully acquired (step S1303). This determination is performed by the updating schedule control section 502.

When the firmware information list has been successfully acquired in step S1303 (Yes in step S1303), a firmware updating information setting screen is displayed (step S1304). More specifically, the UI control section 501 shown in FIG. 5 configures the firmware updating information setting screen (FIG. 7) on the basis of the acquired firmware information, and displays the screen on the display section 311 shown in FIG. 3. Although firmware version is displayed in FIG. 7, the massage "please select firmware version" may be initially displayed on the combo box 702. A pull-down menu may be displayed in response to the operation of the combo box 702 so as to display the version of selectable firmware based on the firmware information list.

On the other hand, when the firmware information list has not been successfully acquired in step S1303 (No in step S1303), an error screen is displayed (step S1305). More specifically, the UI control section 501 shown in FIG. 5 configures the error display screen indicating that the firmware information list has not been successfully acquired, and displays the screen on the display section 311 shown in FIG. 3.

Figure 14:
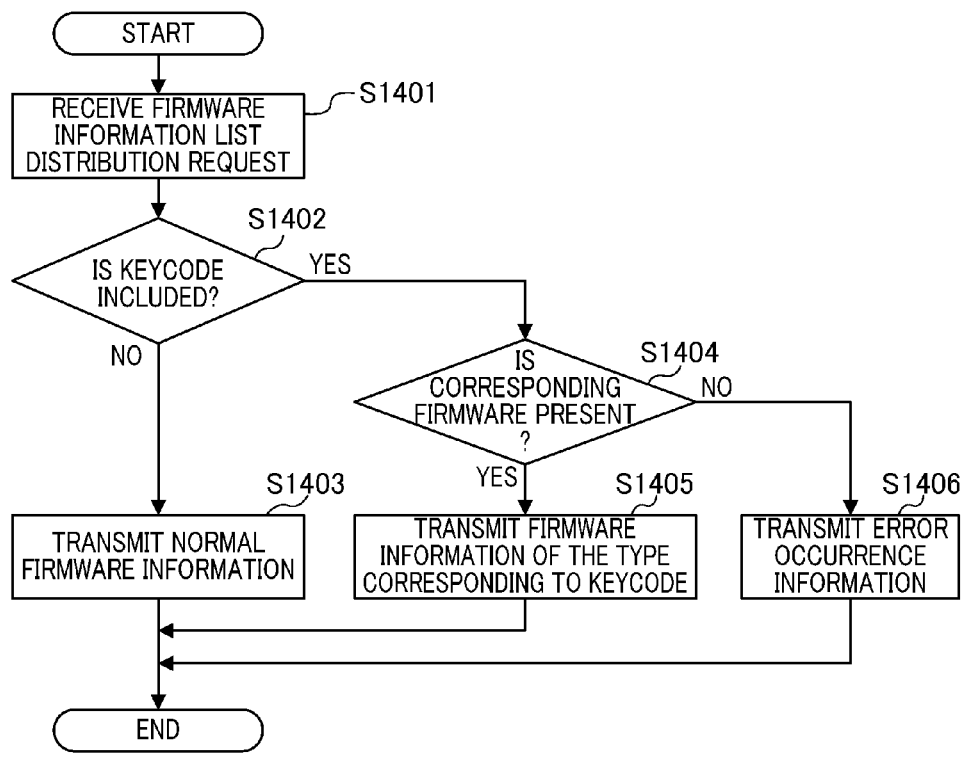
FIG. 14 is a flowchart showing the processing procedure when the firmware distribution server 101 receives a firmware information list distribution request from the firmware updating apparatuses 103, 104, and 105.

Next, the processing procedure when the firmware distribution server 101 receives a firmware information list distribution request from the firmware updating apparatuses 103, 104, and 105 will be described. FIG. 14 is a flowchart showing the processing procedure when the firmware distribution server 101 receives a firmware information list distribution request from the firmware updating apparatuses 103, 104, and 105.

In the flowchart shown in FIG. 14, first, a firmware information list distribution request is received (step S1401). This processing is performed by the communication control section 401 shown in FIG. 4, for example.

Next, it is determined whether or not any keycode is included (step S1402). More specifically, the firmware transmission control section 404 shown in FIG. 4 determines whether or not any keycode is included in the firmware information list distribution request that has been received in step S1401.

When any keycode is not included in step S1402 (No in step S1402), normal firmware information is transmitted (step S1403). Here, the firmware transmission control section 404 transmits the normal firmware information list corresponding to the model to the source of request (the firmware updating apparatus 103 and the like) based on the model information included in the firmware information list distribution request via the communication control section 401.

Figures 15, 16:
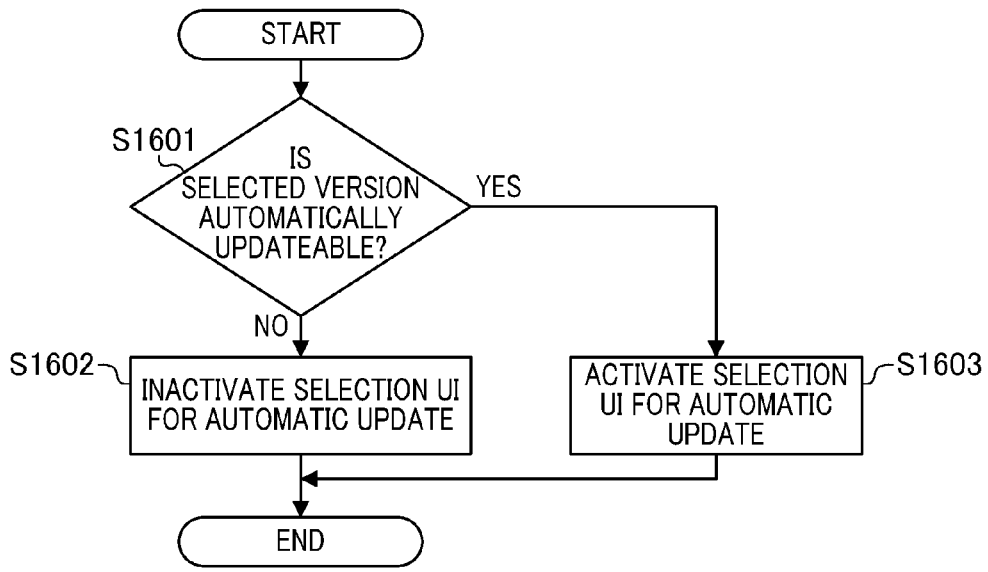
FIG. 15 is a table showing an example of the correspondence table containing associations between a keycode and special firmware.
FIG. 16 is a flowchart showing the processing procedure after the firmware information list has been acquired by the firmware updating apparatuses 103, 104, and 105.

On the other hand, when any keycode is included in step S1402 (Yes in step S1402), it is determined whether or not there is corresponding firmware (step S1404). Here, the firmware transmission control section 404 determines whether or not there is firmware corresponding to the keycode by referring to the correspondence table containing associations between a keycode and special firmware as shown in FIG. 15, for example.

When there is corresponding firmware in step S1404 (Yes in step S1404), the firmware information of the type corresponding to the keycode is transmitted (step S1405). More specifically, the firmware transmission control section 404 transmits the firmware information of the type corresponding to the keycode to the source of request (the firmware updating apparatus 103 and the like) based on the model information included in the firmware information list distribution request via the communication control section 401.

On the other hand, when the corresponding firmware is not present in step S1404 (No in step S1404), error occurrence information is transmitted (step S1406). More specifically, the firmware transmission control section 404 transmits the error occurrence information indicating that the firmware information list is not present to the source of request (the firmware updating apparatus 103 and the like) via the communication control section 401.

Next, the processing procedure after the firmware information list has been acquired in the firmware updating apparatuses 103, 104, and 105 will be described. FIG. 16 is a flowchart showing the processing procedure after the firmware information list is acquired in the firmware updating apparatuses 103, 104, and 105. The following processing is a processing to be executed in response to an instruction or input of a firmware version in the combo box 702 of FIG. 7 that has been displayed in step S1304 of FIG. 13. In response to the result of this processing, the display on the screen shown in FIG. 7 is changed.

In the flowchart shown in FIG. 16, first, it is determined whether or not the selected version is automatically updateable (step S1601). This processing is mainly performed by the determining section 503 and the UI control section 501 shown in FIG. 5, and the detail will be described below. Here, when the selected version is not automatically updateable (No in step S1601), a selection UI for an automatic update is inactivated (step S1602). This processing is performed by the UI control section 501 shown in FIG. 5. By inactivating the selection UI for an automatic update, the version cannot be selected by a user on the UI. Here, "to inactivate" refers to the screen in FIG. 7 being displayed such that no selections can be made. For example, when an automatic update is inactivated, it is contemplated that an automatic radio button be grayed out or the radio button be deleted. Also, "inactivation" is intended to include informing a user that the selected settings are in error after the "automatic" radio button has been selected.

On the other hand, when the selected version is automatically updateable in step S1601 (Yes in step S1601), the selection UI for an automatic update is activated (step S1603). This processing is also performed by the UI control section 501 shown in FIG. 5. By activating the selection UI for an automatic update, the version can be selected by a user on the UI.

Figure 17:
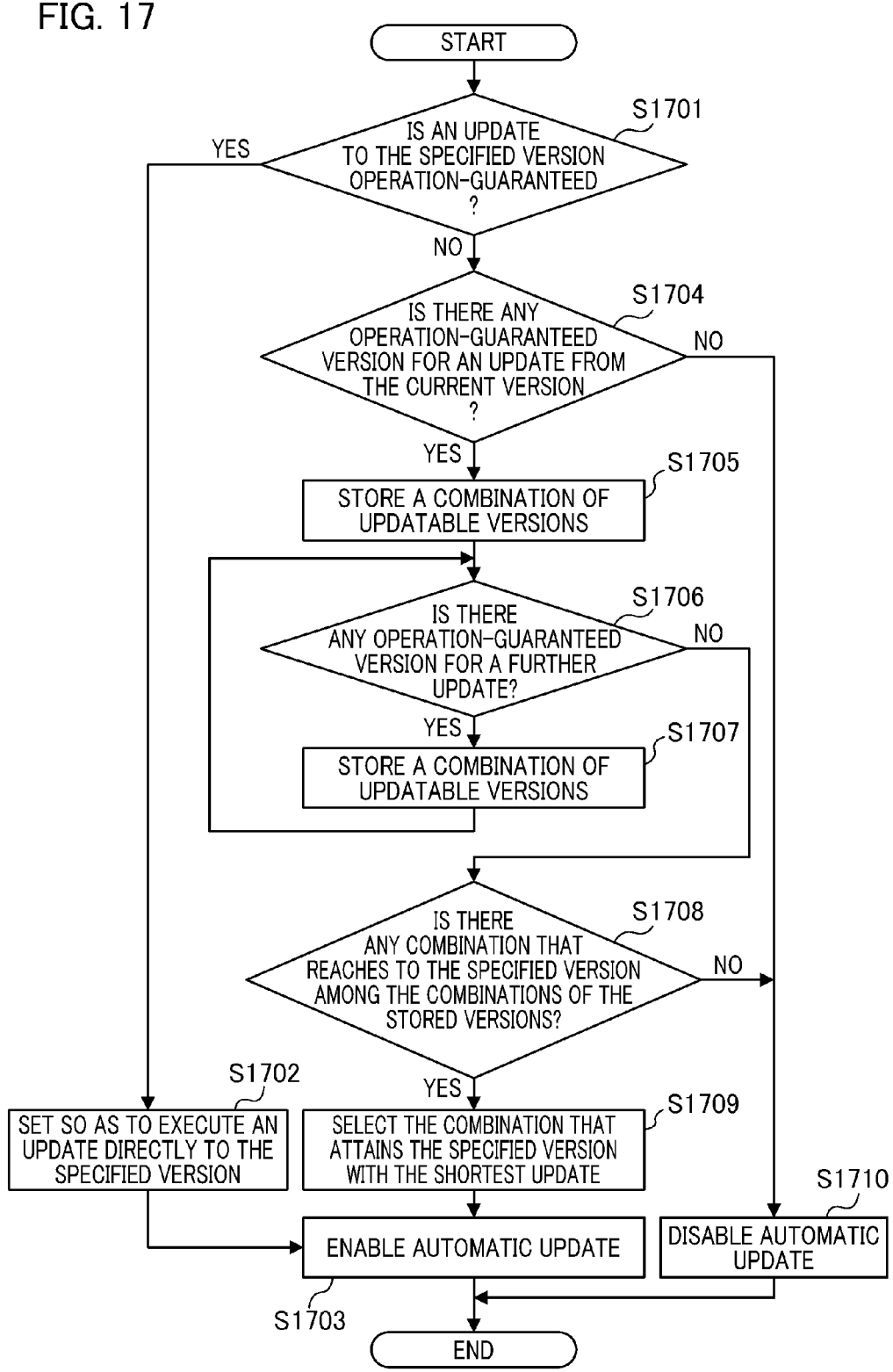
FIG. 17 is a flowchart showing the detailed procedure of a process for determining whether or not the selected version can be automatically updated (step S1601 in FIG. 16).

Next, the detailed procedure of a process for determining whether or not a selected version can be automatically updated (step S1601 in FIG. 16) will be described. FIG. 17 is a flowchart showing the detailed procedure of a process for determining whether or not the selected version can be automatically updated.

In the flowchart shown in FIG. 17, first, it is determined whether or not an update to the specified version is operation-guaranteed (step S1701). Here, the determining section 503 determines whether or not a firmware update from the current version to the specified version is operation-guaranteed by referring to the received firmware information list. Unless otherwise specified in the following, the process shown in FIG. 17 is performed by the determining section 503.

When an update to the specified version is operation-guaranteed in step S1701 (Yes in step S1701), the processing is set such that an update directly to the specified version is executed (step S1702). In other words, as an update procedure in the case where an application timing is automatic while updating firmware, the UI control section 501 directly controls the setting screen such that the UI settings to be updated to the specified version are enabled. Then, the determining section 503 determines that an automatic update is enabled (step S1703). As a result of this determination processing, the UI control section 501 controls the setting screen such that a user can select the "automatic" firmware update timing.

On the other hand, when an update to the specified version is not operation-guaranteed in step S1701 (No in step S1701), the processing checks whether or not there is any operation-guaranteed version for an update from the current version (step S1704). This processing is performed by the determining section 503 that refers to the firmware information list to check whether or not there is any operation-guaranteed version for an update from the current version. Here, when there is any operation-guaranteed version for an update from the current version (Yes in step S1704), a combination of such updatable versions is stored (step S1705). This processing is performed by the determining section 503 that stores the combination of such updatable versions in the RAM 308 and the HDD 309 shown in FIG. 3, for example.

Next, the processing checks whether or not there is any operation-guaranteed version for a further update (step S1706). This processing is performed by the determining section 503, which refers to the firmware information list to check whether or not there is any operation-guaranteed version for a further update. Here, when there is any operation-guaranteed version for a further update (Yes in step S1706), a combination of such updatable versions is stored (step S1707). This processing is performed by the determining section 503 that stores the combination of such updatable versions in the RAM 308 and the HDD 309 shown in FIG. 3, for example. Thereafter, the processing in step S1706 is executed again.

On the other hand, when there is no operation-guaranteed version for a further update in step S1706 (No in step S1706), the processing determines whether or not there is any combination that reaches to the specified version among the combinations of the stored versions (step S1708). More specifically, the determining section 503 checks each combination that has been stored in step S1705 and step S1707 to determine whether or not there is a combination that enables an update from the current version to the specified version.

When there is any combination that reaches to the specified version among the combinations of the stored versions in step S1708 (Yes in step S1708), a combination that reaches to the specified version in the shortest update is selected (step S1709). For example, assume that there are four operation-guaranteed updates, i.e., from version 1.0 to 2.0, version 2.0 to 2.5, version 2.5 to 3.0, and version 2.0 to 3.0. Given that the current version of the image forming apparatus is version 1.0, there are two ways of updating the version of the image forming apparatus from version 1.0 to 3.0. The first way is to update from version 1.0 to 2.0, version 2.0 to 2.5, and version 2.5 to 3.0 in sequence. The second way is to update from version 1.0 to 2.0 and version 2.0 to 3.0. In this case, the latter (second) way is used for updating. This processing is also performed by the determining section 503. Thereafter, the above-described processing in step S1703 is executed.

When there is no operation-guaranteed version for an update from the current version in step S1704 described above (No in step S1704), the determining section determines that the automatic update is disabled (step S1710). More specifically, the UI control section 501 controls the setting screen such that a user cannot select the "automatic" firmware update timing. When there is no combination that reaches to the specified version among the combinations of the stored versions in step S1708 described above (No in step S1708), the processing in step S1710 is executed in the same manner.

Figures 18, 19A, 19B:
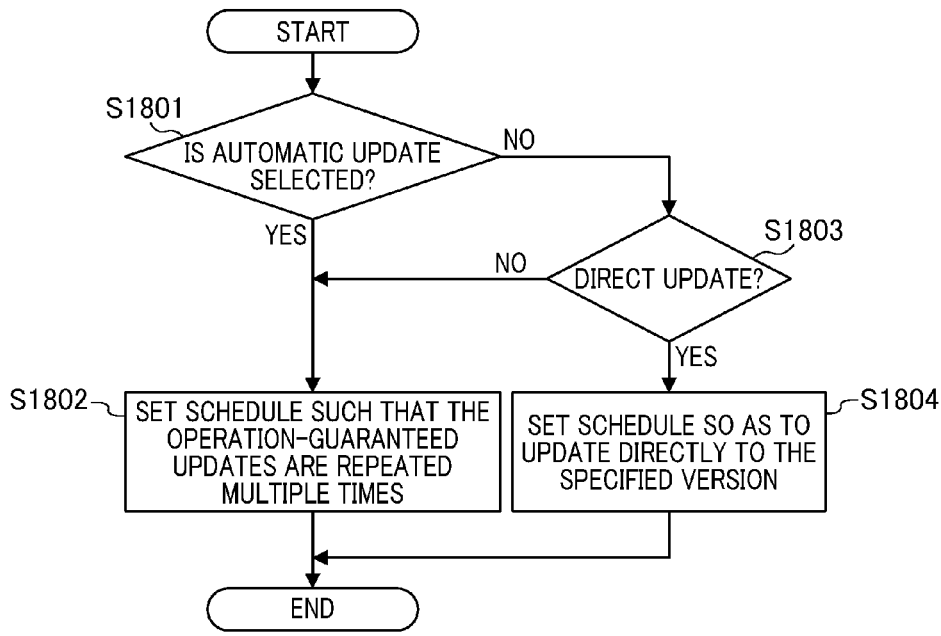
FIG. 18 is a flowchart showing the procedure of schedule setting processing for the firmware update performed by the firmware updating apparatuses 103, 104, and 105.
FIG. 19A is a diagram showing an example of a firmware updating step information file in which an update timing is set to "automatic".
FIG. 19B is a diagram showing an example of a firmware updating step information file in which an update timing is set to "manual".

Next, the procedure of schedule setting processing for the firmware update performed by the firmware updating apparatuses 103, 104, and 105 will be described. FIG. 18 is a flowchart showing the procedure of the schedule setting processing for the firmware update performed by the firmware updating apparatuses 103, 104, and 105. The following processing is started after the OK button 706 shown in FIG. 7 is depressed.

In the flowchart shown in FIG. 18, first, it is determined whether or not the automatic update is selected (step S1801). Here, the updating schedule control section 502 shown in FIG. 5 refers to the UI settings (e.g., state of the toggle button 704 that indicates application timing settings shown in FIG. 7) to be controlled with the UI control section 501 to determine whether or not the automatic update has been selected.

When the automatic update has been selected in step S1801 (Yes in step S1801), schedule settings are performed such that the operation-guaranteed updates are repeated multiple times (step S1802). More specifically, the updating schedule control section 502 sets the firmware updating step information file such that a firmware update is executed by repeating operation-guaranteed firmware update processing. Then, the updating step holding section 504 shown in FIG. 5 stores the firmware updating step information file. The firmware updating step information file will be described in detail later.

On the other hand, when the automatic update has not been selected in step S1801 (No in step S1801), it is determined whether or not the direct update has been selected (step S1803). Here, the updating schedule control section 502 shown in FIG. 5 refers to the UI settings to be controlled with the UI control section 501 (e.g., the state of the toggle button 705, indicating whether or not the settings are the direct update, as shown in FIG. 7) to determine whether or not the direct update has been selected. Here, when the direct update has not been selected (No in step S1803), the above-described processing in step S1802 is performed.

On the other hand, when the direct update has been selected in step S1803 (Yes in step S1803), the schedule settings are performed so as to update directly to the specified version (step S1804). More specifically, the updating schedule control section 502 sets the firmware updating step information file so as to directly update to the specified firmware. Then, the updating step holding section 504 stores the firmware updating step information file.

Here, the firmware updating step information file will be described in detail. Hereinafter, a description will be given for an example in which an update from firmware version 1.0.1 to firmware version 3.0.1 is performed.

FIG. 19(A) is a diagram showing an example of the firmware updating step information file in which an update timing is set to "automatic". In this example, when the update timing is automatic, the scheduling is arranged so as to perform a version update by repeating an operation-guaranteed update. Hence, version 1.1.1 is applied at first and then version 3.0.1 is applied.

FIG. 19(B) is a diagram showing an example of the firmware updating step information file in which an update timing is set to "manual". This is an example of the direct update settings. Therefore, although an update from version 1.0.1 to version 3.0.1 is not operation-guaranteed, the scheduling is arranged so as to update directly to version 3.0.1.

Figure 20:
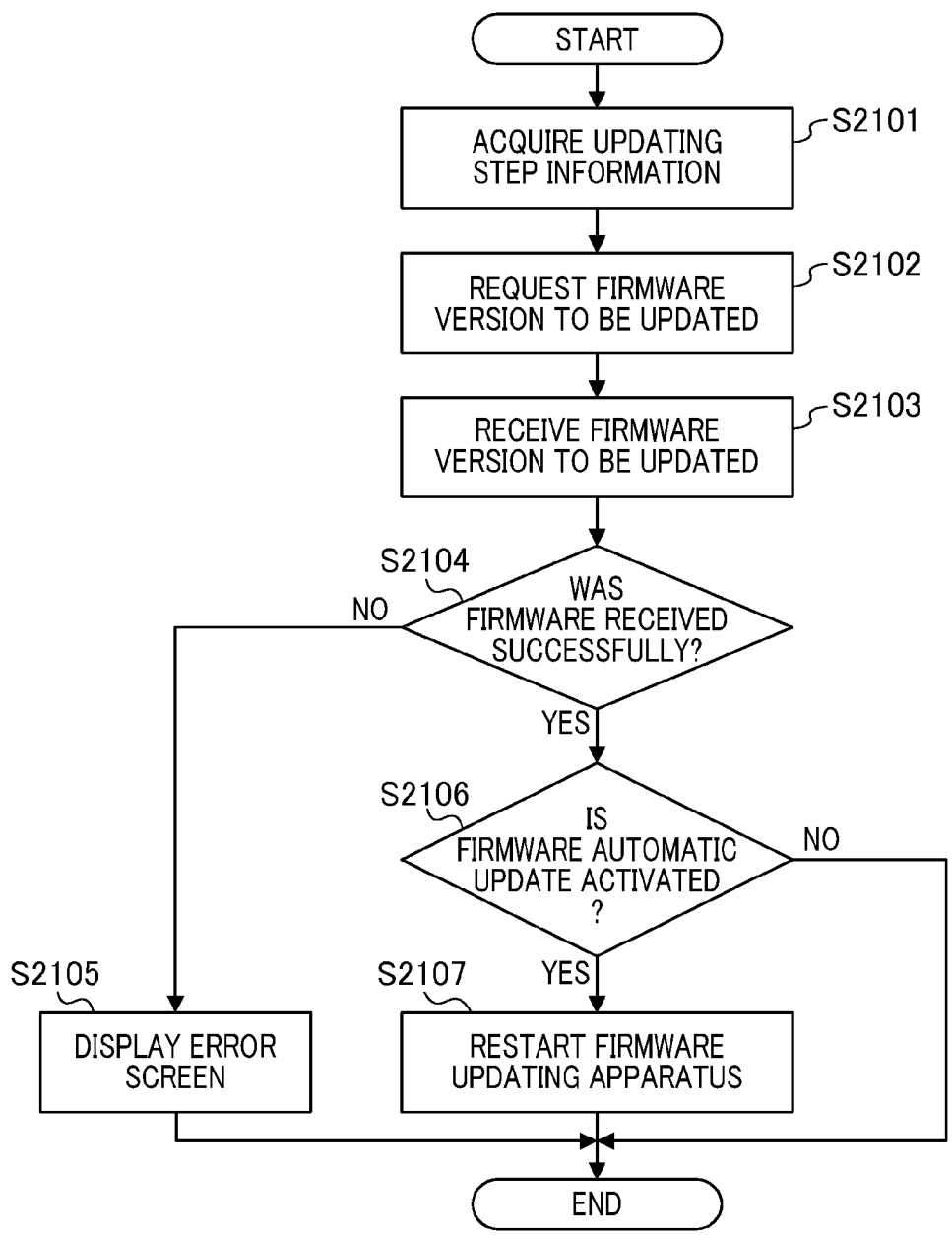
FIG. 20 is a flowchart showing the procedure of firmware update processing performed by the firmware updating apparatuses 103, 104, and 105.

Next, the procedure of firmware update processing performed by the firmware updating apparatuses 103, 104, and 105 will be described. FIG. 20 is a flowchart showing the procedure of firmware update processing performed by the firmware updating apparatuses 103, 104, and 105.

In the flowchart shown in FIG. 20, first, updating step information is acquired (step S2101). More specifically, the update processing section 505 shown in FIG. 5 acquires the firmware version information to be updated from the firmware updating step information file held by the updating step holding section 504.

Next, the firmware version to be updated is requested (step S2102). Here, the update processing section 505 transmits a transmission request for the firmware version to be updated with respect to the firmware distribution server 101 via the communication control section 506.

Next, the firmware version to be updated is received (step S2103). Here, the update processing section 505 receives the firmware version to be updated, which has been transmitted from the firmware distribution server 101, via the communication control section 506. It should be noted that the received firmware may be temporality stored in a storage unit (e.g., RAM 306 or the like shown in FIG. 3).

Subsequently, it is determined whether or not firmware has been received successfully (step S2104). This determination is performed by the update processing section 505. Here, when firmware has been received unsuccessfully (No in step S2104), an error screen is displayed (step S2105). For example, the UI control section 501 displays a screen indicating that a reception error has occurred on the display section 311 shown in FIG. 3.

On the other hand, when firmware has been received successfully in step S2104 (Yes in step S2104), it is determined whether or not a firmware automatic update is activated (step S2106). This determination is performed by the update processing section 505 that refers to the firmware updating step information file to determine whether or not the automatic update is activated. Here, when the firmware automatic update is not activated (No in step S2106), the process is terminated immediately.

On the other hand, when the firmware automatic update has been activated in step S2106 (Yes in step S2106), the firmware updating apparatus is restarted (step S2107).

Figure 21:
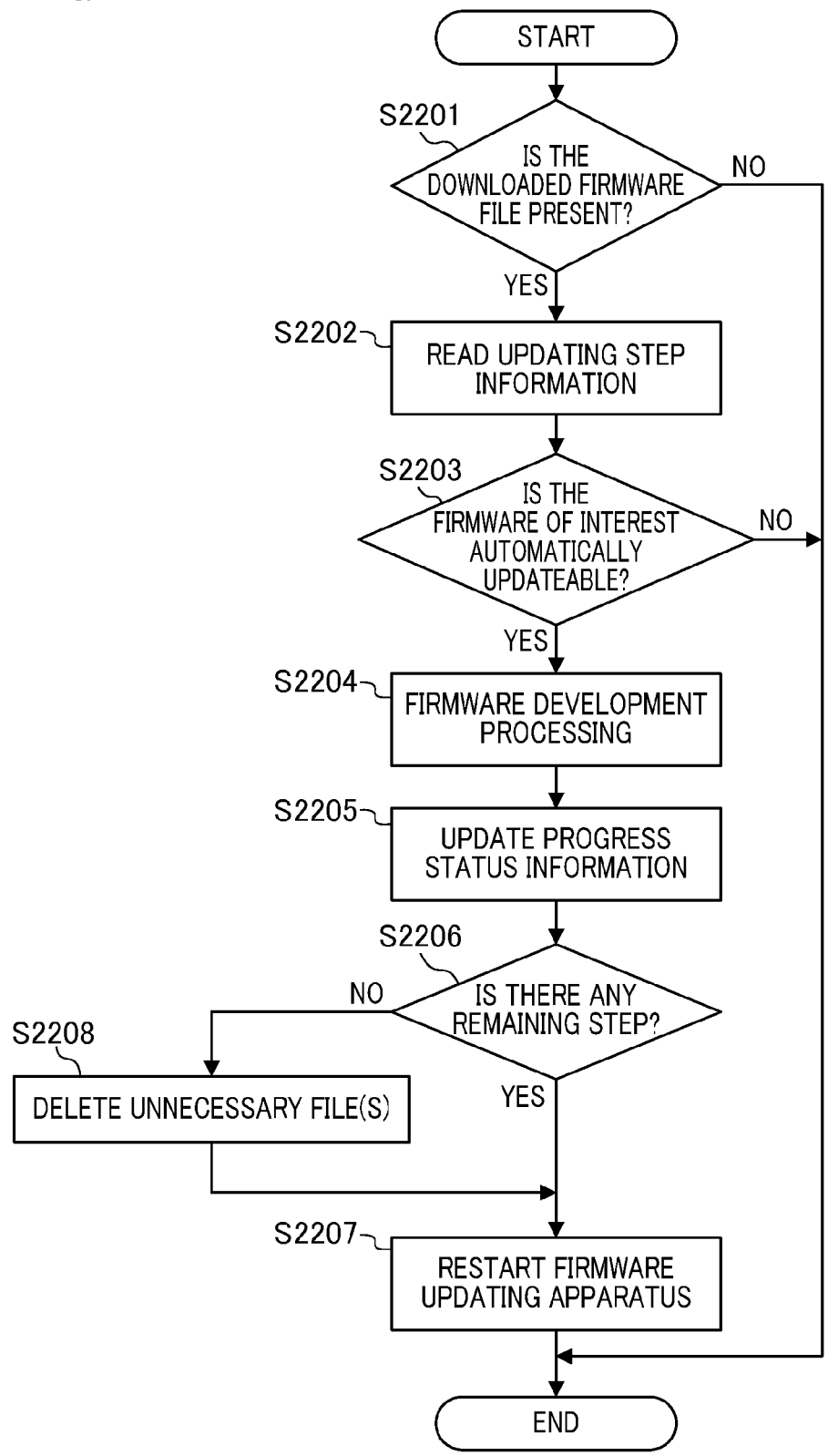
FIG. 21 is a flowchart showing the procedure of firmware update confirmation processing performed by the firmware updating apparatuses 103, 104, and 105.

Subsequently, the procedure of firmware update confirmation processing performed by the firmware updating apparatuses 103, 104, and 105 will be described. FIG. 21 is a flowchart showing the procedure of firmware update confirmation processing performed by the firmware updating apparatuses 103, 104, and 105. The following processing is executed after the restart of the firmware updating apparatuses 103, 104, and 105 (process in step S2107 shown in FIG. 20).

In the flowchart shown in FIG. 21, first, it is determined whether or not the downloaded firmware file is present (step S2201). This processing is performed by the update processing section 505. Here, when the downloaded firmware file is absent (No in step S2201), the process is terminated immediately.

On the other hand, when the downloaded firmware file is present in step S2201 (Yes in step S2201), updating step information is read (step S2202). More specifically, the update processing section 505 reads the firmware updating step information file that corresponds to the firmware file and is held by the updating step holding section 504.

Next, it is determined whether or not the firmware of interest is automatically updateable (step S2203). More specifically, the update processing section 505 refers to the firmware updating step information file that has been read in step S2202 to determine whether or not the firmware to be updated is automatically updateable. Here, when the firmware of interest is not automatically updateable (No in step S2203), the process is terminated immediately.

On the other hand, when the firmware of interest is automatically updateable in step S2203 (Yes in step S2203), firmware development processing is performed (step S2204). More specifically, the update processing section 505 performs the firmware development processing on the basis of the progress status information of the firmware updating step information file that has been read in step S2202.

Next, progress status information is updated (step S2205). Here, the updating schedule control section 502 updates the progress status information of the firmware updating step information file on the basis of the progress status of firmware update processing.

Subsequently, it is determined whether or not there is a remaining step (step S2206). More specifically, the update processing section 505 determines whether or not there is firmware to be subjected to further update processing. Here, when there is a remaining step (Yes in step S2206), the firmware updating apparatus is restarted (step S2207).

On the other hand, when there is no remaining step in step S2206 (No in step S2206), any unnecessary files are deleted (step S2208). This processing is performed by the update processing section 505. The term "unnecessary file" refers to a file that is not used in further processing, including the firmware updating step information file corresponding to the firmware that is no longer applicable after the completion of firmware update. After this processing, the process advances to step S2207.

Figure 22:
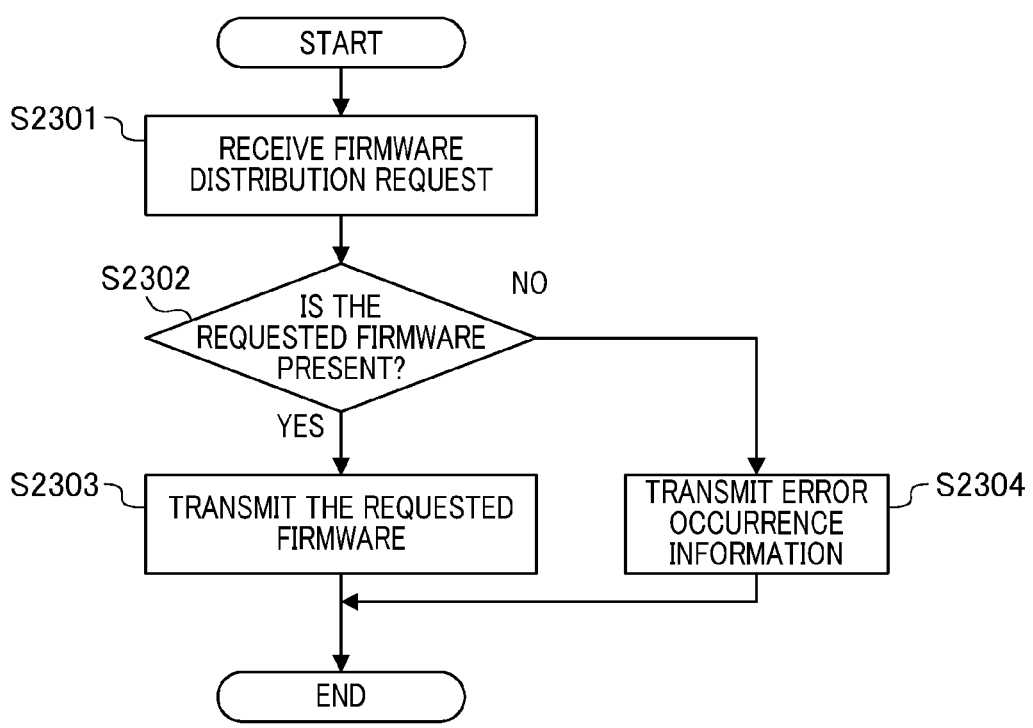
FIG. 22 is a flowchart showing the processing procedure of the firmware distribution server 101 when a firmware distribution request is received.

Finally, the processing procedure of the firmware distribution server 101 when a firmware distribution request is received from the firmware updating apparatuses 103, 104, and 105 will be described. FIG. 22 is a flowchart showing the processing procedure of the firmware distribution server 101 when a firmware distribution request is received.

In the flowchart shown in FIG. 22, first, a firmware distribution request is received (step S2301). This processing is performed by the communication control section 401 shown in FIG. 4, for example.

Next, it is checked whether or not the requested firmware is present (step S2302). More specifically, the firmware transmission control section 404 shown in FIG. 4 checks whether or not there is firmware that has been requested from the storage unit (e.g., first HDD 205 or the like shown in FIG. 2) in the server. Here, when the requested firmware is present (Yes in step S2302), the requested firmware is transmitted (step S2303). More specifically, the firmware transmission control section 404 transmits the relevant firmware to the requesting source (firmware updating apparatus 103 or the like) via the communication control section 401.

On the other hand, when the requested firmware is absent in step S2302 (No in step S2302), error occurrence information is transmitted (step S2304). More specifically, the firmware transmission control section 404 transmits the error occurrence information indicating that there is no relevant firmware to the source of request (firmware updating apparatus 103 or the like) via the communication control section 401.

As described above, according to the present embodiment, firmware update processing can be efficiently and reliably performed without placing any burden on the user. For example, when an operation-guaranteed update is only available as "an update from version 1 to version 2" or "an update from version 2 to version 3", an automatic update from version 1 to version 3 can be performed.

Also, when a firmware update is manually performed, an update directly to the specified version can be performed, resulting in reduction in time used for a firmware update operation.

For the sake of simplifying the description of the present embodiment of the present invention, authentication processing with respect to a firmware distribution request is not illustrated. However, of course, only the request from the authenticated source of request may be processed. Also, the above embodiment has been specifically illustrated by way of example only in practicing the present invention and it is apparent that the interpretation of the technical scope of the present invention is not to be limited by the description of the embodiment. In other words, the present invention may allow various modifications without departing from the main scope of the present invention.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-042571, filed Feb. 25, 2009, which is hereby incorporated by reference herein in its entirety.

What is claimed is:

1. A firmware updating method comprising:
    providing a firmware update setting display which designates first, second, and third settings,
    the first setting designating a new firmware version to be applied to an apparatus,
    the second setting selecting one of an automatic update which downloads the new firmware version from a firmware distribution server and automatically applies the new firmware version to the apparatus without receiving an update starting instruction and a manual update which downloads the new firmware version from the firmware distribution server and applies the new firmware version to the apparatus based on the update starting instruction,
    the third setting selecting one of a first option which updates the current firmware version to another firmware version which is operationally guaranteed and then updates the another firmware version to the new firmware version and a second option which directly updates the current firmware version to the new firmware version,
    wherein, when the manual update is selected for the second setting, selection of the third setting is enabled, and when the automatic update is selected for the second setting, selection of the third setting is disabled;
    determining whether or not a direct update from a current firmware version to the new firmware version is enabled when the automatic update is selected for the second setting of the firmware update setting display or when the first option is selected for the third setting of the firmware update setting display;
    determining whether or not the update to the new firmware version is enabled through an intervention of another version update, if it is determined that the direct update to the new firmware version is disabled; and
    executing the update to the new firmware version through the intervention of another version update, if it is determined that the update from the current firmware version to the new firmware version is enabled through the intervention of another version update.

2. The firmware updating method according to claim 1, wherein information relating to a version that is updateable directly from the current firmware version is received from an external apparatus, and the update determining determines whether or not a single-time update is enabled on a basis of the received information.

3. The firmware updating method according to claim 2, wherein if the automatic update is selected, the version of the new firmware is downloaded so as to execute a firmware update by using the downloaded firmware.

4. The firmware updating method according to claim 3, wherein if it is determined that the update from the current firmware version to the new firmware version is disabled even through the intervention of another version update, the new firmware version is downloaded so as not to execute an update to the downloaded firmware version.

5. The firmware updating method according to claim 1, wherein even if it is determined that the update from the current firmware version to the new firmware version is enabled through the intervention of another version update, but if the automatic update is not selected, an update from the current firmware version to the new firmware version is performed without the intervention of another version update.

6. The firmware updating method according to claim 1, wherein if there are a plurality of methods for updating firmware to the new firmware version through the intervention of another version update, the updating performs an update by the method with a least number of updates.

7. A non-transitory computer-readable storage medium that stores a program for causing a computer to execute a firmware updating method comprising:
    providing a firmware update setting display which designates first, second, and third settings,
    the first setting designating a new firmware version to be applied to an apparatus, the second setting selecting one of an automatic update which downloads the new firmware version from a firmware distribution server and automatically applies the new firmware version to the apparatus without receiving an update starting instruction and a manual update which downloads the new firmware version from the firmware distribution server and applies the new firmware version to the apparatus based on the update starting instruction, the third setting selecting one of a first option which updates the current firmware version to another firmware version which is operationally guaranteed and then updates the another firmware version to the new firmware version and a second option which directly updates the current firmware version to the new firmware version, wherein, when the manual update is selected for the second setting, selection of the third setting is enabled, and when the automatic update is selected for the second setting, selection of the third setting is disabled;

determining whether or not a direct update from a current firmware version to the new firmware version is enabled when the automatic update is selected for the second setting of the firmware update setting display or when the first option is selected for the third setting of the firmware update setting display;

determining whether or not the update to the new firmware version is enabled through an intervention of another version update, if it is determined that the direct update to the new firmware version is disabled; and executing the update to the new firmware version through the intervention of another version update, if it is determined that the update from the current firmware version to the new firmware version is enabled through the intervention of another version update.

8. The non-transitory computer-readable storage medium according to claim 7, further comprising performing an update by a method with a least number of updates if there are a plurality of methods for updating firmware to the new firmware version through the intervention of another version update.

9. A firmware updating apparatus comprising at least a processor functioning as:
a firmware update setting display unit which is configured to designate first, second, and third settings,
the first setting designating a new firmware version to be applied to an apparatus,
the second setting selecting one of an automatic update which downloads the new firmware version from a firmware distribution server and automatically applies the new firmware version to the apparatus without receiving an update starting instruction and a manual update which downloads the new firmware version from the firmware distribution server and applies the new firmware version to the apparatus based on the update starting instruction,
the third setting selecting one of a first option which updates the current firmware version to another firmware version which is operationally guaranteed and then updates the another firmware version to the new firmware version and a second option which directly updates the current firmware version to the new firmware version, wherein, when the manual update is selected for the second setting, selection of the third setting is enabled, and when the automatic update is selected for the second setting, selection of the third setting is disabled;
an update determining unit configured to determine whether or not a direct update from a current firmware version to the new firmware version is enabled when the automatic update is selected for the second setting of the firmware update setting display or when the first option is selected for the third setting of the firmware update setting display;
a determining unit configured to determine whether or not the update to the new firmware version is enabled through an intervention of another version update, if it is determined that the direct update to the new firmware version is disabled; and
an updating unit configured to execute the update to the new firmware version through the intervention of another version update, if it is determined that the update from the current firmware version to the new firmware version is enabled through the intervention of another version update.

10. The firmware updating apparatus according to claim 9, wherein information relating to a version that is updateable directly from the current firmware version is received from an external apparatus, and the update determining unit determines whether or not a single-time update is enabled on a basis of the received information.

11. The firmware updating apparatus according to claim 10,
wherein if the automatic update is selected, the version of the new firmware is downloaded so as to execute a firmware update by using the downloaded firmware.

12. The firmware updating apparatus according to claim 11, wherein if it is determined that the update from the current firmware version to the new firmware version is disabled even through the intervention of another version update, the new firmware version is downloaded so as not to execute an update to the downloaded firmware version.

13. The firmware updating apparatus according to claim 9, wherein even if it is determined that the update from the current firmware version to the new firmware version is enabled through the intervention of another version update, but if the automatic update is not selected, an update from the current firmware version to the new firmware version is performed without the intervention of another version update.

14. The firmware updating apparatus according to claim 9, wherein if there are a plurality of methods for updating firmware to the new firmware version through the intervention of another version update, the updating unit performs an update by an updating method with a least number of updates.

15. The non-transitory computer-readable storage medium according to claim 7, further comprising determining whether or not a single-time update is enabled on a basis of information,
wherein the information relating to a version that is updateable directly from the current firmware version is received from an external apparatus.

16. The non-transitory computer-readable storage medium according to claim 15, further comprising:
selecting an automatic update in which the firmware version is updated to the new firmware version without waiting for an update starting instruction; and
downloading the version of the new firmware so as to execute a firmware update by using the downloaded firmware if the automatic update is selected.

17. The non-transitory computer-readable storage medium according to claim 16, further comprising downloading the new firmware version so as not to execute an update to the downloaded firmware version if it is determined that the update from the current firmware version to the new firmware version is disabled even through the intervention of another version update.

\* \* \* \* \*